Feb. 2, 1960  S. RAPPAPORT  2,923,468
COMPONENT SOLVING AND INTEGRATING SYSTEM
Filed Aug. 21, 1957  2 Sheets-Sheet 1

INVENTOR
SIGMUND RAPPAPORT
BY Victor D. Borst
ATTORNEY

Feb. 2, 1960     S. RAPPAPORT     2,923,468
COMPONENT SOLVING AND INTEGRATING SYSTEM
Filed Aug. 21, 1957     2 Sheets-Sheet 2
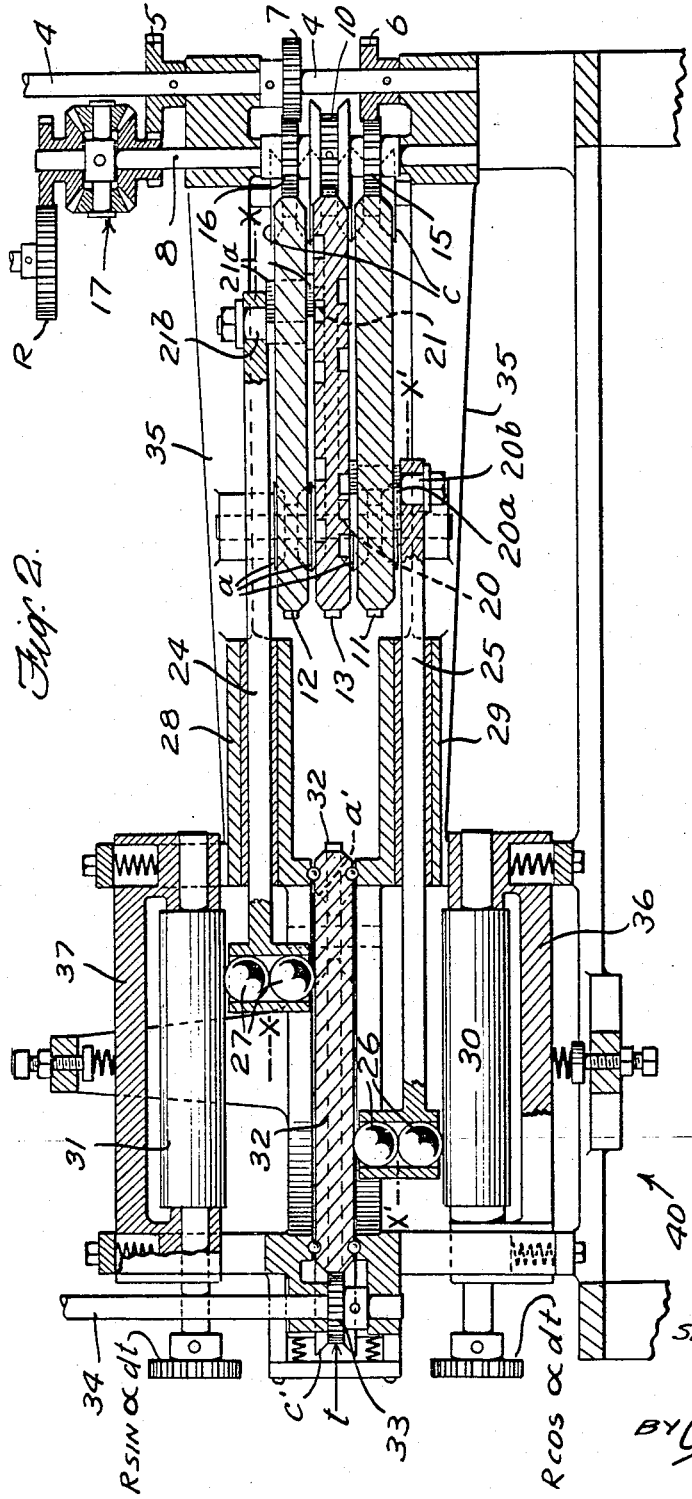
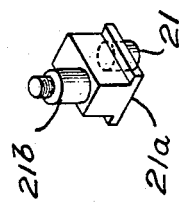
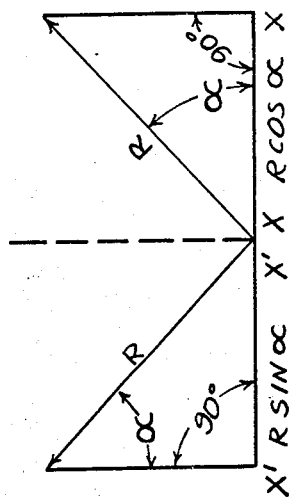
INVENTOR
SIGMUND RAPPAPORT
ATTORNEY

United States Patent Office 2,923,468
Patented Feb. 2, 1960

2,923,468

COMPONENT SOLVING AND INTEGRATING SYSTEM

Sigmund Rappaport, Port Washington, N.Y., assignor to Sperry Rand Corporation, Ford Instrument Company Division, Long Island City, N.Y., a corporation of Delaware Application August 21, 1957, Serial No. 679,423

2 Claims. (Cl. 235—61.5)

This invention relates to component integrators and more particularly to component integrator systems employing a component solver and a disk integrator.

While component integration, which is the continuous accumulation of the changes of a vector's length in two directions, at right angles to each other, has been achieved by center ball component integrators or computing systems employing two standard component solvers and two independent ball and disc integrators, the present invention provides a specially designed single unit component integrator having a dual acting component solver and a dual acting integrator for accumulating continuously and simultaneously the changes of a vector's length in terms of the vector's components.

The elements of each dual acting unit are so disposed to each other as to permit the employment of a single, floating and shaft free cam and disc, respectively.

The principal object of the invention is to provide a new and improved component integrator, which is compact in design and economical to produce without sacrificing accuracy.

Having stated the principal object of the invention, other and more limited objects of the invention will be apparent on reading the following detailed description taken in conjunction with the drawings, in which:

Fig. 2 is a section taken on line 2—2 of Fig. 1, additionally showing the input means for the computer;

Fig. 3 is a vector diagram illustrating the operation of the computer; and

Fig. 4 is a view of one of the vector gear slide blocks and pin attachments employed by the component solver.

Figure 1:
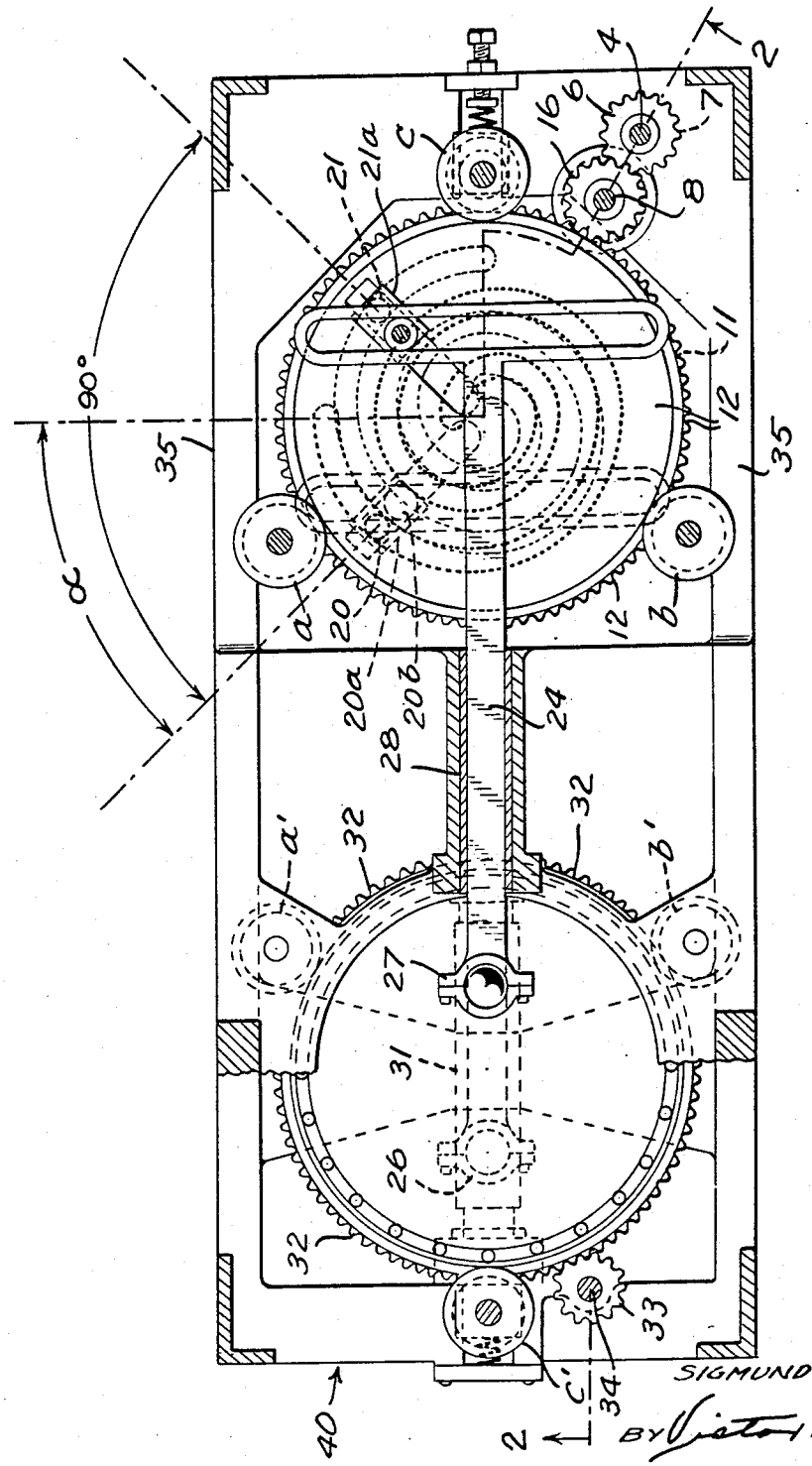
Fig. 1 is a plan of the component integrator.

The component integrator has two inputs, a changing linear value R and a changing angular vector value $\alpha$. A shaft 4 having a gear 5 and spur gears 6 and 7 mounted thereon is settable in accordance with the quantity $\alpha$. A shaft 8 carrying gear 10, the teeth of which are set in with respect to its top and bottom faces, is driven in accordance with the value R plus $\alpha$ as explained below.

The two inputs as set into what is essentially a double component solver which comprises two vector gears 11 and 12 each having a single radial slot and a floating cam gear 13 which carries on both its faces a groove in the form of an Archimedes spiral. The vector gears 11 and 12 including floating gear 13 are axially spaced from one another and supported exclusively by three grooved rollers $a$, $b$ and $c$ spaced equidistantly around the gears as shown in Fig. 1. One of the grooved rollers $c$ is spring loaded so as to bias the vector and cam gears against the grooved rollers $a$ and $b$ which are rotatably supported on fixed stud shafts. Each stud shaft supports three rollers for independent rotation. The stud shafts for the rollers $a$ and $b$ are carried by four horizontal arms 35 which are integral with the frame of the machine. The spring loaded grooved roller $c$ is mounted in a bearing block and is slidably supported in the right hand end of the frame of the machine.

The two spirals on the cam faces are turned relative to each other by 90° so that the positions of the pins in the radial slots in the vector gears are maintained 90° apart at all times. The cam gear 13 has a peripheral flange with teeth engaging the gear 10 whereby it is driven by the shaft 8. Input gears 15 and 16 are freely mounted on the shaft 8 and are in driven connection with gears 6 and 7, respectively. The gears 15 and 16 drive the vector gears 11 and 12, respectively.

The shaft 8 is actually the spider shaft of differential 17 on one end gear of which there is placed the linear value R, the other end gear of the differential being in mesh with the gear 5 on shaft 4. The movement in the spiral cam grooves formed in the cam gear 13 of followers 20 and 21 as a result of the turning of the vector gears is thus prevented by causing the cam gear to turn the same amount as the vector gears as shaft 4 is turned to introduce the quantity $\alpha$. In this way the vector gears can be turned without disturbing the value R represented by the radial position of the followers and which was set into the device by the shaft 8.

Affixed to each follower 20 and 21 are slide blocks 20$a$ and 21$a$ engaging in the slots of vector gears 11 and 12, respectively, and pins 20$b$ and 21$b$ which are slidably received in slots formed in the cross pieces 22 and 23 of T bars 24 and 25, respectively. The pins 20$b$ and 21$b$ and the followers 20 and 21 are offset from each other respectively so that the spiral cam in operation can have R equal to zero. The fact that it is impractical to manufacture the cam with the grooves cut in the cam starting at the center of the cam makes this offset necessary. The T bars serve to position the ball carriages 26 and 27 of integrator 40 and are slidably mounted in integrator bearings 28 and 29 being displaced therein by the component solver along codirectional axes, $x$—$x$ and $x'$—$x'$. As shown in Fig. 3 the displacement of the pins along these axes is proportional to R sin $\alpha$ and R cos $\alpha$ because the pins and vector slots are always 90° apart.

The integrator 40 has a pair of output rollers 30 and 31 mounted in spring biased bearing blocks 36 and 37, respectively, so as to bear against the integrator balls in carriages 26 and 27, respectively. The integrator disc 32 and the cam and vector gears of the component solver are peripherally supported by two fixed rollers $a'$ and $b'$ and a spring loaded roller $c'$. Thus center shafts are eliminated in both components so that the entire surface of their rotative elements are available for computing. The integrator disc is toothed and driven by a constant time pinion 33 and shaft 34 so that the output rollers 30 and 31 are adapted to yield the quantities $\int R \cos \alpha \, dt$ and $\int R \sin \alpha \, dt$, respectively.

It is understood that the various modifications may be made in the computing system as described and illustrated without departing from the scope of the invention as defined in the appended claims.

What is claimed is:

1. A component integrating system comprising a component solver having a cam gear with a spiral groove on each face turned relative to each other by 90°, a vector gear mounted proximate each face of said cam gear, each of said vector gears being disposed concentrically of said cam gear, means for rotating said vector gear in accordance with the angular value $\alpha$, means for turning said cam in accordance with the linear value R plus the angular value $\alpha$, each of said vector gears having a vector slot, the slots in said vector gears being permanently oriented 90° apart, a cam follower disposed in each of the spiral grooves of said cam gear, a slide block affixed to each follower and slidably received in each vector slot and an output pin affixed to each block, an integrator having a pair of output rollers and ball carriages, a disc, one of said output rollers and one of said ball carriages being urged into driven contact with each side of said disc, means for rotating said disc in accordance with time, and sine-cosine resolver means connecting each of the pins of said component solver to one of the ball carriages of said integrator for positioning said ball carriages, said connecting means having their positioning axes of displacement codirectional.

2. A component integrating system as claimed in claim 1 in which there are provided rollers circumferentially supporting said cam and vector gears in said component solver.

References Cited in the file of this patent

UNITED STATES PATENTS

| | | |
|---|---|---|
| 2,385,952 | Svoboda | Oct. 2, 1945 |
| 2,502,991 | Rast | Apr. 4, 1950 |

FOREIGN PATENTS

| | | |
|---|---|---|
| 89,205 | Austria | Aug. 25, 1922 |